United States Patent [19]

Nickerson et al.

[11] 3,765,908

[45] Oct. 16, 1973

[54] TREATING FOOD WITH POLYPEPTIDE HADDOCK EXTRACT TO PREVENT THE OUTGROWTH OF CLOSTRIDIUM BOTULINUM

[75] Inventors: John T. R. Nickerson, Somerville, Mass.; Janusz M. Zak, Seattle, Wash.

[73] Assignee: Massachusetts Institute of Technology, Cambridge, Mass.

[22] Filed: Aug. 12, 1971

[21] Appl. No.: 171,350

[52] U.S. Cl............... 426/321, 99/154, 99/157, 99/158, 99/112, 260/112
[51] Int. Cl............................................. A23l 3/00
[58] Field of Search............... 99/150, 158, 154, 99/160, 157, 112, 18, 211, 214, 215, 216; 260/112, 112.5; 424/95; 124/95

[56] References Cited
UNITED STATES PATENTS
3,607,311   9/1971   Haas.................................... 99/154
3,265,682   8/1966   Gloor................................... 99/158
3,164,471   1/1965   Whaley............................... 260/112
3,054,678   9/1962   Michener............................ 99/158

*Primary Examiner*—Norman Yudkoff
*Assistant Examiner*—Hiram H. Bernstein
*Attorney*—Arthur A. Smith, Jr. et al.

[57] ABSTRACT

The outgrowth of anaerobic spore-forming bacteria in foods is prevented by adding to the food a mixture of polypeptide having a molecular weight between 1,100 and 1,400 and then heating the mixture to a temperature between about 200° to 270° F. for a period between about 1.5 minutes to 30 minutes. The polypeptide materials reduce the heating requirements needed to prevent outgrowth of the bacteria having a heat resistance equivalent to *Clostridium Botulinum*, type E.

4 Claims, No Drawings

TREATING FOOD WITH POLYPEPTIDE HADDOCK EXTRACT TO PREVENT THE OUTGROWTH OF CLOSTRIDIUM BOTULINUM

The invention herein described was made in the course of work performed under Contract No. AT(30-1)-4049 with the Atomic Energy Commission.

This invention relates to a method for processing foods to prevent the outgrowth of spore forming anaerobic bacteria.

At the present time, the outgrowth of spore forming bacteria is prevented in canned foods by heating the food in a sealed can at a temperature of about 250° F. for varying periods of time to kill any *Clostridium Botulinum* and other spore forming bacteria present in the food. If this bacteria is not killed, and the food is ingested, botulism will result with its high incidence of death and if other bacteria are not killed the food spoils. While heating for the presently employed time is an effective method for killing these bacteria, the process is undesirable in that heating causes the food to lose flavor and to become partially deteriorated. In addition, the expense associated with heating for these times is undesirably high. Accordingly, there is a present incentive to provide an alternative means for preventing the outgrowth of anaerobic bacteria in foods wherein the foods could be processed while minimizing loss of flavor and food deterioration.

The present invention provides a process for treating foods to prevent the outgrowth of *Clostridium Botulinum* type E whereby the food is admixed with a polypeptide fraction of haddock and heated for a period of time much shorter than in present processes. The present invention is based upon the discovery that a polypeptide fraction isolated from fresh haddock prevents the outgrowth of *Clostridium Botulinum* type E. The polypeptide fraction is obtained by blending the meat of fresh haddock with distilled water and recovering the polypeptide fraction by extraction and separating the extract on the basis of molecular weight. The polypeptide fraction that retards the growth of *Clostridium Botulinum* type E has a molecular weight between about 1,100 and about 1,400. This fraction, when added to foods not containing proteolytic enzymes that break-down the polypeptides, reduces the heat needed to kill the *Clostridium Botulinum* type E present. Sufficient heating to effect the desired results can be from about 1.5 minutes to 30 minutes at a temperature between about 200° to 270° F. Unpackaged food such as fresh fish is treated under milder conditions then packaged foods to retain food flavor without food deterioration. Thus, unpackaged food is treated at a temperature between about 200° to 220° F. for short periods while packaged foods can be treated at any temperature within the broad range. Obviously, more heating can be employed but with the undesirable results noted above.

The polypeptides are isolated by first isolating a protein fraction of haddock extract obtained from haddock meat which is either fresh or has been maintained at low temperatures to prevent degradation of the polypeptides by the proteolytic enzymes present in the haddock. The haddock extract obtained by comminuting the haddock meat in the presence of distilled water maintained at a relatively low temperature below about 5° C. The water and comminuted haddock are admixed until homogenization is attained. The resulting homogenate then is separated into a liquid fraction and a solids fraction such as by centrifugation; with the desired fish extract comprising a liquid fraction. The liquid fraction either can be separated to obtain the polypeptides as described below or can be stored at low temperatures about −18° C. until used in further processing. The protein fraction is isolated from the fish extract by any desirable means. A particularly useful means is described in Alden in "Methods in Enzymology," Volume I, (1955) in an article entitled "Protein Fractionation on the Basis of Solubility in Aqueous Solutions of Salts and Organic Solvents." In this method, a specified concentration of ammonium sulphate aqueous solution is added to the extract and intimately mixed therewith at a relatively low temperature. A suspension is obtained which then is centrifuged to recover a precipitate. The precipitate can be further purified by dialysis against distilled water and the dialyzed protein fraction can be concentrated such as by freeze-drying.

The protein fraction is separated into its components on the basis of molecular weight by any desirable means such as gel filtration carried out on Sephadex columns according to the methods described by Determan in "Gel Chromatography," New York: Springverlag, 1968 or in "Sephadex-Gel Filtration in Theory and Practice," published 1963. Separation of the protein fraction conveniently is separated on a G-25 Sephadex column.

When employing gel filtration, the protein fraction is dissolved in a buffer to form a protein solution and then is passed through the gel column. A suitable solvent for use in fractionation comprises an 0.01 molar phosphate buffer pH 6.8 to 7.0 which can be prepared from a mixture of sodium dibasic phosphate and potassium monobasic phosphate.

The polypeptide fraction comprises a mixture of polypeptide having a molecular weight within the range of about 1,100 to about 1,400 which is obtained for the low molecular weight protein fraction of haddock. The fraction comprises predominately polypeptide having a molecular weight of about 1,200 and about 1,350.

The isolated polypeptide fraction is added to the food to be processed in amounts of at least about 500 mg per kg of food, preferably between about 1,000 mg and 10,000 mg per kg of food. Obviously, more polypeptide can be employed but no significant improvements are obtained with amounts added above the stated range. The food to which the polypeptide fraction is added should contain no proteolytic enzymes. Otherwise, the polypeptide would be broken down in the food and would be rendered useless for its intended purpose. Suitable foods to which the fraction can be added include vegetables, soups, fish (preheated), or meat (preheated). The fish and meat are preheated to eliminate the proteolytic enzymes therein. In a preferred embodiment of this invention, the food to be processed and the polypeptide fraction are mixed and the mixture is sealed in a container such as a glass jar or metal can. The sealed container containing the mixture is heated, usually with steam, to the desired temperature for the desired period and then cooled. In this manner, food deterioration and loss of flavor are minimized.

The following examples illustrate the present invention and are not intended to limit the same.

EXAMPLE I

This sample illustrates a method for separating the polypeptides in fresh haddock according to molecular weight which were then tested as described in the examples below.

Portions of 50 grams of haddock fillets were blended in a tube with 100 ml of distilled water, for 3 minutes in a Sorvall Omnimixer. The blending tube was immersed in an ice bath during homogenization, to maintain the temperature of the mixture below about 5° C. The homogenate obtained in this manner was centrifuged in 250 ml bottles for 20 minutes at $4.5 \times 10^3$G under refrigeration. The resultant supernatant was concentrated by freeze-drying using a shelf temperature between 6° and 10° C. The freeze-dried material was dissolved in a phosphate buffer, pH 6.8, prepared from sodium dibasic phosphate and potassium monobasic phosphate, to provide a solids concentration of 20 percent. This stock solution was poured in 50 ml proportions at −40° C. prior to utilization for experimentation. Just prior to use, the haddock extract was defrosted in a water bath at 5° to 10° C.

The freeze-drying step referred to above, was carried out by placing diluted material in an aluminum tray and freezing the material at −40° C. overnight. The thickness of the solution on the tray was approximately ½ inch and was freeze-dried in a Vitris freeze-drier with a platen at 6° to 10° C. After the drying cycle, the vacuum was broken with air and the materials were placed in a vacuum dessicator over anhydrous calcium sulfate.

The protein fraction of the haddock extract-phosphate solution was isolated using ammonium sulfate solution. Powdered ammonium sulfate, 39.0 gm, was added to 100 ml of haddock extract and the resultant solution was maintained in an ice bath and continually mixed with a magnetic stirrer for 45 minutes. The resultant suspension was centrifuged in a 50 ml tube for 40 minutes at $9.0 \times 10^3$G under refrigeration. The precipitate obtained was washed twice with 60 percent saturated ammonium sulfate solution. Excess reagent was removed from the precipitate by dialysis against distilled water, and the dialyzed protein fraction was concentrated by freeze-drying. Protein extract sampled were prepared for fractionation by dilution with an 0.01 M phosphate buffer, pH 7.0, at 4° C., to a final solids concentration of five percent. These samples were centrifuged at 20 minutes at $9.0 \times 10^3$G to remove all materials that might precipitate out in the chromatographic column and interfere with the fractionation of the samples. Fractions of 5 ml each were collected using an automatic fraction collector and the isolated fractions were concentrated by freeze-drying and redissolved in 0.01 molar phosphate buffer, pH 6.8.

The samples then were separated in a G-25 Sephadex column having dimensions of 10 × 950 mm with a total bed volume of 75 cm³. The flow rate was adjusted to 10 to 11 ml per hour. The size of the sample fractionated was 1 ml. With the G-25 Sephadex column, fractionation was obtained in the molecular weight range of 1,000 to 5,000. The effluent from the columns was passed continuously through an ultra-violet detector (LKB-U Unicord U.V. Absorption Meter, Control Unit type 8301A) with the wave length adjusted at 280 mu. This detector unit was connected to a Bausch and Lomb Volt type recorder, which continuously recorded the optical density of all aliquot samples. The chart moved at a speed of 4 inches per hour. The concentration of each fraction is determined by determining the area under the curve generated by the optical density as a function of volume processed as recorded by the detector unit.

EXAMPLE II

This example describes how the lag phase or time needed for the growth of *Clostridium Botulinum* type E in various media including haddock was determined. The method described below was employed in the following examples to initiate growth of *Clostridium Botulinum* type E unless indicated otherwise.

A portion of 1 ml of a spore suspension of *Clostridium Botulinum* type E was heat shocked at 65° C. for 10 minutes, then diluted and plated out on Trypticase-Peptone-Grucose Agar medium to obtain 50 to 100 colonies per plate. The inoculated plates were incubated anaerobically for 18 hours at 30° C. After that time, 3 colonies from each plate were transferred into 10 ml of pre-heated and cooled Trypticase-Peptone-Grucose-Yeast extract medium. The medium was stratified with vaspar, and incubated at 10° C. until an abundant growth was obtained. Two more transfers were subsequently made into flasks containing 90 ml and 400 ml respectively of the same medium. The last transferred culture was incubated at 10° C. until 70 to 90 percent of sporulation could be observed by a microscopic examination.

Spores of *Clostridium Botulinum* type E were separated by centrifugation under refrigeration, in 250 ml bottles for 25 minutes at $9 \times 10^3$G, then washed three times with distilled water and stored at 0° to 1° C. Bacteria prepared as above was added to ground fish meat to determine the growth rate of the bacteria therein. The samples were prepared by blending strictly fresh haddock fillet which were caught within 48 hours of being frozen. The fillets were stored in a frozen state at −40° C. until used. When used, the fillets were defrosted overnight at 7° C. and ground twice in a meat grinder fitted with a grinder plate having holes 3/16 of an inch in diameter. 20 grams portions of the ground fish were placed in 50 ml plastic tubes and sterilized with ionizing radiation at a level of $4.0 \times 10^6$ rads, and then incubated for 24 to 48 hours at 7° C., prior to inoculation with *Clostridium Botulinum* type E spores. Incubation was conducted in the absence of air and the outgrowth of *Clostridium Botulinum* type E in the substrate in flasks was estimated by the presence of gas therein.

By employing this test method with a large number of samples, the growth of *Clostridium Botulinum* type E in the haddock has been determined to be about 12 days. It should be noted that this lag phase compares favorably with the lag phase observed in other fish. For example, the lag phase in ocean perch or mackerel is about 4 ½ days for Clostridium Botulinum type E.

EXAMPLE III

To determine the outgrowth of *Clostridium Botulinum* in the protein fraction of haddock extract, the following experiment was carried out. The protein fraction of haddock was isolated in the manner described in Example I. The concentrated protein fraction was diluted with phosphate pH 6.8, to provide a solids content of 10 percent. Samples of the extract were sterilized by irradiation with $4.0 \times 10^6$ rads and then incubated for 2 days at 10° C. before inoculation with spores of *Clostridium Botulinum* type E and further incubation at this temperature. Other samples were prepared comprising either treated haddock protein fraction or haddock protein fraction having added thereto various additives including yeast extract, ocean perch protein extract having a molecular weight above about 20,000, ocean perch protein extract having a molecular weight between 4,000 and 20,000, ocean perch having a molecular weight between 1,000 and 4,000, ocean perch extract having a molecular weight below 1,000, yeast extract having a molecular weight of between 3,000 and 1,000 and Trypsin. The results are shown in Table I:

gas and the turbidity of samples. It was noticed that the anaerobic count seemed to increase in these samples by one logarithmic cycle after 60 days of incubation. In these samples there was no loss in anaerobic count below the original level at any period of incubation.

EXAMPLE IV

To determine which fractions, if any, of the whole haddock protein extract had the effect of retarding the outgrowth of *Clostridum Botulinum* type E the following experiment was conducted. Strictly fresh haddock fillets were divided into three 300 gram portions and processed as follows: Sample 1 was immediately extracted with distilled water, freeze-dried and stored at −40° C. in the manner described above in Example I. Sample 2 was irradiated with 0.4 Mrads, incubated for 15 days at 10° C. and then extracted freeze-dried and stored in the manner described above in Example I. Sample 3 was irradiated with 3.0 Mrads, incubated for 15 days at 10° C. and then extracted freeze-dried and stored in the manner described for Example I.

TABLE I

Outgrowth of clostridium botulinum Type E in the protein fraction of haddock extract, supplemented with yeast extract, ocean-perch fractions, heated and hydrolyzed with trypsin

| Substrate | Gas production (days) | Anaerobic count (bacteria/ml.) days of incubation at 10° C. | | | | |
|---|---|---|---|---|---|---|
| | | 3 | 7 | 12 | 15 | 61 |
| Plain protein fraction of haddock extract [PFHE] | None | $1.1 \times 10^4$–$1.9 \times 10^4$ | | | $0.8 \times 10^4$–$1.6 \times 10^4$ | $1.4 \times 10^5$–$1.5 \times 10^5$ |
| Heated [PFHE] | None | $1.1 \times 10^4$–$1.2 \times 10^4$ | | | $0.95 \times 10^4$–$1.1 \times 10^4$ | $0.55 \times 10^5$–$1.05 \times 10^5$ |
| [PFHE] plus yeast extract fraction (100–3,000 molecular weight) | 4 | $1.8 \times 10^4$–$3.7 \times 10^4$ | $1.4 \times 10^6$–$2.7 \times 10^6$ | | | |
| [PFHE] plus ocean perch protein fraction, m.w. 20,000 | 10 | $1.4 \times 10^4$–$1.56 \times 10^4$ | $1.9 \times 10^4$–$2.7 \times 10^4$ | $1.7 \times 10^5$–$3.1 \times 10^6$ | | |
| [PFHE] plus ocean perch protein fraction, m.w. 4,000–20,000 | 12 | $0.9 \times 10^4$–$1.05 \times 10^4$ | $1.6 \times 10^4$–$3.1 \times 10^4$ | $2.4 \times 10^5$–$2.8 \times 10^5$ | | |
| [PFHE] plus ocean perch protein fraction, m.w. 1,000–4,000 | None | $1.8 \times 10^4$–$2.1 \times 10^4$ | | | | $3.1 \times 10^5$–$4.8 \times 10^5$ |
| [PFHE] plus ocean perch protein fraction, m.w. 1,000 | 6 | $2.1 \times 10^4$–$2.14 \times 10^4$ | $6.1 \times 10^5$–$7.2 \times 10^5$ | | | |
| Trypsinized [PFHE] | 7 | $0.47 \times 10^4$–$0.6 \times 10^4$ | $8.9 \times 10^4$–$3.1 \times 10^5$ | | | |
| Trypsin, control | None | $0.94 \times 10^4$–$1.3 \times 10^4$ | | | | $1.95 \times 10^5$–$2.2 \times 10^5$ |

In the control samples, the boiled samples and those supplemental with the ocean perch fraction of about 1,000 molecular weight, the outgrowth of *Clostridium Botulinum* type E was not supported. That is, for these fractions there was no turbidity or gas production after 80 days of incubation. The fastest outgrowth was obtained on samples supplemented with yeast extract fraction, in which case gas production was observed within 4 days of incubation at 10° C. A sample supplemented with ocean perch having a molecular weight of 460 showed outgrowth after 6 days of incubation at 10° C. The addition of the high molecular weight of ocean perch fraction supported an outgrowth of *Clostridium Botulinum* type E only after 10 to b 12 days of incubation. Mild hydrolysis with trypsin of the haddock protein fraction decreased the duration of the lag phase of this organism to 7 days of incubation at 10° C.

The sample supplemented with yeast extract decreased the duration of the lag phase from 7 to 4 days. There was no decrease in anaerobic count below the original level in the haddock protein fraction supplemented with the yeast extract samples. The supplementation of the haddock protein fraction with high and low molecular weight of ocean perch showed that the high molecular weight fractions was effective to accelerate outgrowth of *Clostridium Botulinum* while the low molecular weight extract fractions gave the opposite result.

No outgrowth of *Clostridium Botulinum* type E occurred in the unsupplemented protein fraction of haddock extract in 65 days, as judged by its production of Anaerobic, and aerobic counts showed that irradiated haddock fillets did not decompose bacterialogically after 15 days of incubation at 10° C. Fish extracts were concentrated by freeze-drying and redissolved in phosphate buffer, pH 6.8, to obtain a solids concentration of about 10 percent. All samples were subsequently placed in an ice-bath and sterilized by irradiation with $3.0 \times 10^6$ rads. Each sample then was innoculated with heat-shocked spores of *Clostridium Botulinum* type E incubated, and the lag phase observed. The duration of the lag phase in Sample 1 was 43 days. The duration of lag phase in Sample 2 was 4 ½ days and the duration of the lag phase in Sample 3 was 11 days.

A portion of each haddock sample was separated on a Sephadex column G-100 and a Sephadex column G-25. There was no significant difference between the fractions on the Sephadex columns G-100. However, there was a significant difference in the compositions separated on the G-25 column. These differences are shown in Table II.

TABLE II

Values representing the concentration of fractions of plain haddock extract and extracts obtained from haddock fillets treated with different doses of ionizing radiation and preincubated for 15 days at 10° C. prior to extraction; their relationship to the outgrowth times of *clostridium botulinum* Type E in these fractions

| | Lag time (days) | Flow rate (ml. per 15 min.) | Mixture m.w. peaks, 1,200 and 1,300 | | M.w. peak 700 | | M.w. peak 400 | |
|---|---|---|---|---|---|---|---|---|
| | | | Peak area (sq. inch) | Concentration of fractions [2] | Peak area found (sq. inch) | Concentration of fraction | Peak area found (sq. inch) | Concentration of fraction [2] |
| 1 | 43 | 4.0 | 4.90 | 19.6 | 3.0 | 12.0 | 1.85 | 7.4 |
| 2 | 4½ | 3.8 | 0.72 | 2.2 | 8.6 | 32.7 | 9.0 | 33.2 |
| 3 | 11 | 4.0 | 4.15 | 16.6 | 9.0 | 36.0 | 5.5 | 22.0 |

The values for the peak areas in Table II were obtained by chromatographic separation of the haddock extract according to its molecular weight and the generation of the curve according to ultra-violet optical density as a function of flow rate of haddock extract through the chromatographic column. The concentration of the fractions were obtained by multiplying the flow rate times the peak area found on the graph. The peaks for the molecular weights 1,200 and 1,350 were not sufficiently resolved to enable independent treatment of them. As seen from Table II, the concentration of the polypeptides having a molecular weight of 1,200 and 1,350 is far greater in Sample 1 than in either Sample 2 or Sample 3. On the other hand, the concentration of polypeptides having a molecular weight of 400 and 700 is greater in Samples 2 and 3 as compared to Sample 1. It is believed that the described methods of treating Samples 2 and 3 serve to break down the polypeptides having molecular weights of 1,200 to 1,350 for form polypeptides having a molecular weight of about 400 and 700.

EXAMPLE V

The above examples show that low molecular weight protein fractions of haddock extract have a very pronounced effect on the outgrowth time of *Clostridium Botulinum* type E. This example shows the effect of supplementation of Casein Hydrolystate Medium (CHM) with haddock extract fractions, obtained by fractionation on a G-25 Sephadex column, on the outgrowth of type E *Clostridium Botulinum*. *Three fractions of different molecular weight were isolated according to the procedure outlined above,*

F I— molecular weight greater than 4,000
F II— molecular weight between 1,400 and 1,150
F III— molecular weight between 800 and 400

These fractions were concentrated by freeze drying, redissolved in 10 ml of phosphate buffer, pH 6.8 and sterilized by irradiation with $3.0 \times 10^6$ rads. A three fold concentrated casein hydrolystate medium was prepared and sterilized by filtration.

The solution containing the investigated fractions of haddock extract were mixed with concentrated casein hydrolysate medium in the proportion of 2:1 and inoculated with approximately $1.0 \times 10^4$ heat shocked spores of *Clostridium Botulinum* type E per ml. Inoculated samples were stratified with vaspar and two percent agar, then incubated at three temperatures: 10° C., 15° C. and 20° C. The duration of the lag phase of *Clostridium Botulinum* type E was estimated on the basis of gas production. The results of this experiment are presented in Table III.

TABLE III

Effect of various haddock fractions on the outgrowth of clostridium type E in casein hydrolysate medium

| Samples | Lag time (days) | | |
|---|---|---|---|
| | 10° C. | 15° C. | 20° C |
| Casein hydrolysate medium (control) | 33 | 10 | 4 |
| Casein hydrolysate medium plus F I of haddock extract | 16 | 3½ | 1 |

Table III—Continued

Effect of various haddock fractions on the outgrowth of clostridium type E in casein hydrolysate medium

| Samples | Lag time (days) | | |
|---|---|---|---|
| | 10° C. | 15° C. | 20° C |
| Casein hydrolysate medium plus F II of haddock extract | None[1] | None[1] | 8 |
| Casein hydrolysate medium plus F III of haddock extract | 7 | 2½ | ⅔ |

[1] No outgrowth after 55 days of incubation.

The presented data showed that the addition of fraction III to casein hydrolysate medium accelerated the outgrowth of *Clostridium Botulinum* type E. When fraction III was added to the casein hydrolysate medium, the duration of the lag phase of this organism was decreased by more than 4 fold, irrespective of the incubation temperature. The addition of high molecular weight fraction to casein hydrolysate medium also accelerated the outgrowth of *Clostridium Botulinum* type E, but its effect was less pronounced than that of fraction III; and the effect was less pronounced when the temperature of incubation was lowered. The addition of fraction I of haddock extract to casein hydrolysate medium decreased the lag time of *Clostridium Botulinum* type E incubated at 30° C., to 1/4 that of the control, while when the incubation temperature was 10° C. the lag time was 1/2 as great as that of the control.

After 55 days neither turbidity, nor gas production could be detected in casein hydrolysate medium supplemented with fraction II of haddock extract when the incubation temperature did not exceed 15° C. However, casein hydrolysate medium samples containing this fraction did give an outgrowth after 8 days of incubation at 20° C. At this temperature the duration of the lag phase of *Clostridium Botulinum* type E in casein hydrolysate medium supplemented with fraction II of haddock extract was twice as long as that of the casein hydrolysate medium control samples. There was no change in the anaerobic counts in the casein hydrolysate medium supplemented with the fraction II of haddock extract after 20 days of incubation at 10° C.

We claim:

1. The process of treating food free from a proteolytic enzyme to prevent the outgrowth of *Clostridium Botulinum* type E which comprises adding to the food a polypeptide extract obtained from haddock and having a molecular weight between about 1,100 and 1,400, in an amount above about 500 mg per kg food, and heating the mixture to a temperature from about 200° to 270° F. for a period between about 1.5 minutes to 30 minutes.

2. The process of claim 1 wherein the extract is added in amounts of between 1,000 and 10,000 mg per kg food.

3. The process of claim 1 wherein the mixture is sealed in a container prior to being heated.

4. The process of claim 2 wherein the mixture is sealed in a container prior to being heated.

* * * * *